Patented Oct. 20, 1942

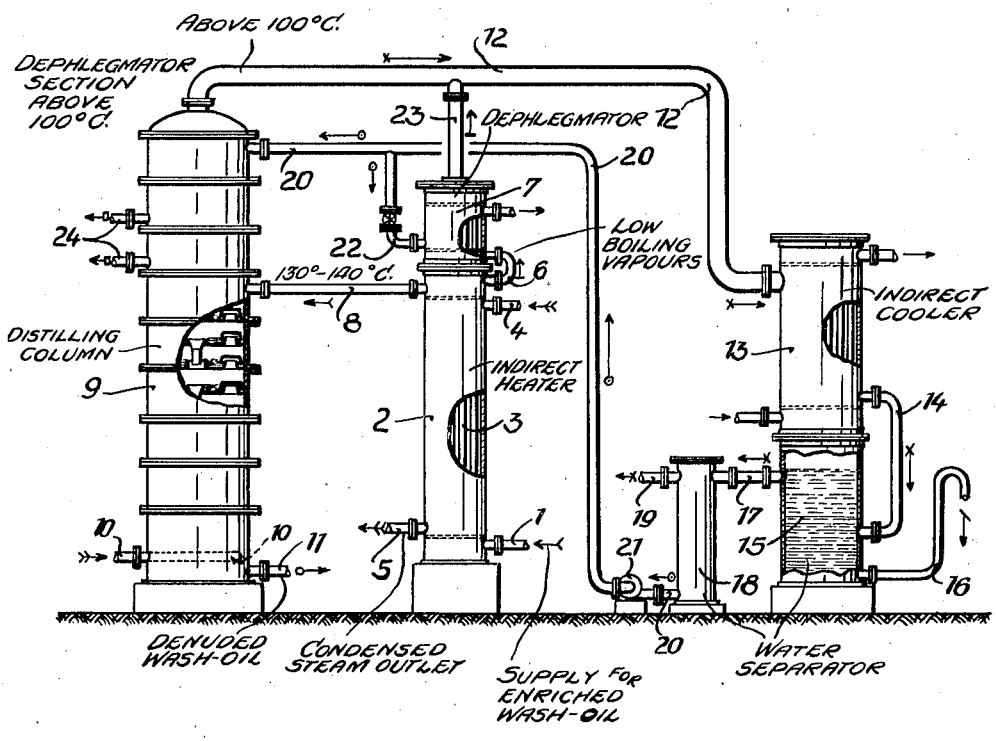

2,299,282

UNITED STATES PATENT OFFICE 2,299,282

METHOD FOR THE RECOVERY OF HIGH-GRADE CRUDE FROM ENRICHED BENZOL WASH OIL

Adolf Schmalenbach, Essen, Germany, assignor, by mesne assignments, to Koppers Company, Pittsburgh, Pa., a corporation of Delaware Application August 27, 1938, Serial No. 227,103 In Germany September 2, 1937

1 Claim. (Cl. 196—8)

The present invention relates to the recovery of benzol from coal distillation gases or the like by means of wash-oil from which the benzol absorbed is separated by distillation in the presence of steam.

Up to now, this method of recovery of benzol from gas was carried out in such a manner that the wash-oil laden with benzol and leaving the gas scrubber, i. e., the so-called enriched wash-oil flows through a heater into a distilling column to which direct steam is added. A mixture of steam, vapours of wash-oil and benzol and its homologues escapes from the distilling column. This vaporous mixture is cooled-down and thereafter the water is separated from the condensed oily matter by decanting or in any other suitable manner. Finally the oily constituents are rectified. The benzol and its homologues distil over during the rectification as crude benzol, while the wash-oil freed from benzol is obtained in the residue of the still.

The main object of my invention is to provide an advantageous solution of the problem of recovering a high-grade crude from the enriched benzol wash-oil in a single treatment by means of steam distillation without a subsequent rectification of the distillate from the still so that a crude containing only very small amounts of wash-oil is obtained.

The process according to my invention is essentially characterized by the following operating method:

The enriched wash-oil first of all flows through an indirect oil heater where it is heated to temperatures of about 130 to 140 degrees centigrade in the absence of and without the addition of any appreciable quantity of steam.

During this heating-up, the low boiling constituents contained in the enriched wash-oil are partly evaporated. The vapours pass through a dephlegmator, thence they enter directly the cooler where the distillate of the still is condensed. The oil warmed-up in the oil heater flows to a distilling column where the benzol hydro-carbons are distilled off by the addition of direct steam. The vapourous mixture thus obtained consisting of steam, vapours of wash-oil and benzol together with its homologues is delivered to a dephlegmator which is maintained at a temperature of about 100 degrees centigrade so that water may not condense. Consequently, only the wash-oil is retained in the dephlegmator while steam and benzol escape and enter the cooler. The vapours from the oil heater together with the vapours from the still are condensed in the cooler. Finally, the water condensed in the cooler is separated from the oily condensate by decanting or the like.

The present invention further comprehends means for the extraction of wash-oil of a special composition, said means being arranged in the upper part of the distilling column, for instance, for the separation of wash-oil with such a high content of naphthalene that naphthalene may be crystallized by a normal cooling-down. The special advantage of this mode of carrying out my invention consists in that the benzol recovery plant can, without making an appreciable extension, be used at the same time for the removal of naphthalene from the gas.

With the above and other objects and features of my present invention in view, I will now describe a preferred embodiment of my invention on the lines of the accompanying drawing, in which the single figure is an elevational view, partly in cross-section, of apparatus embodying the present invention. The supply for enriched wash-oil is marked 1. This oil comes for instance from a storage tank which is not shown on the drawing. This storage tank is in connection with the gas purification plant. The indirect oil heater 2 is fitted with heating tubes 3 which get the steam through the pipe line 4 while the condensed steam runs-off at point 5.

The oil is preheated to a temperature of about 130 to 140 degrees centigrade in the heater 2.

A pipe connecting piece 6 leads vapors of low boiling fractions from the cover of the heater 2 to a dephlegmator 7.

The oil warmed up in the heater 2 flows through the pipe line 8 to the middle part of the distilling column 9. Steam is admitted to this column from below through the pipe line 10. The denuded wash-oil freed from the benzol constituents taken-up in the gas scrubber leaves the bottom of the column through the pipe line 11.

The benzol-crude vapours from the column 9 are withdrawn through the pipe line 12 coming from the top of the column. Pipe line 12 leads to a pipe type indirect cooler 13, in which the benzol-crude vapours are condensed. The benzol-crude condensate flows through the pipe line 14 to a water separator 15 where water from benzol crude and the like is extracted. The water accumulating on the bottom of the separator 15 is discharged through the pipe line 16. Benzol and its homologues flow through the pipe line 17 to a separating tank 18 in which the residual water may separate.

A high-grade benzol crude may finally be discharged through the pipe line 19 at the upper part of separating tank 18.

From the bottom of the separating tank 18, there leads a pipe line 20 over a pump 21 to the upper end of the distilling column. This upper end serves simultaneously as a dephlegmator to which a part of the condensate is returned as phlegm or "lutter" by line 20 in order to improve the separation of the wash-oil vapours from benzol and homologues. The pipe line 20 is fitted with a branch 22 leading to the dephlegmator 7 to which a regulatable part of the condensate from the cooler is returned by line 20 as phlegm to the dephlegmator 7 and from which the vapours flow through the pipe line 23 into the main vapour pipeline 12.

A series of oil outlets 24 is provided in the upper part of the distilling column 9 in order to be able to withdraw several oil fractions of special composition such as naphthalene.

The apparatus is run in such a manner that the temperature of the vapours withdrawing from the column 9 always lies above 100 degrees centigrade so that water may neither collect in the column 9 nor interrupt the distillation and dephlegmation in 9. The temperature of the oil heater must be adjusted accordingly so that a sufficient amount of easily boiling constituents, i. e. constituents boiling below 100 degrees centigrade, is evaporated. Under certain conditions it may be of advantage to condense separately the vapours leaving the heater 2 so that the phlegm returned to the top of column 9 consists of the distillate from only this column and the dephlegmator 7 is charged with a condensate of only the vapours escaping from this dephlegmator 7 as phlegm.

The oil entering oil heater 2 is preferably free from water or nearly free from water. If the water content of the oil is too high so that the removal of the low-boiling constituents and the dephlegmation in the apparatus 7 are interrupted, it is of advantage to remove the water by heating the oil to a temperature of about 60 degrees centigrade and by decanting it at this temperature. For this purpose, the oil heater arrangement may also consist of two stages with a water separator built between these two stages.

I have now above described the present invention on the lines of a preferred embodiment thereof, but my invention is not limited in all its aspects to the mode of carrying it out as described and shown, the invention may be variously embodied within the scope of the following claim.

I claim:

A method for recovery of a high-grade benzol crude from enriched benzol wash-oil which method comprises: a primary distilling stage of preheating the benzol enriched wash-oil and a subsequent distilling stage in which the benzol crude constituents are extracted from the preheated wash-oil from the primary distilling stage in a distilling column by means of direct steam, removing the low boiling constituents boiling below 100° C. from the enriched wash-oil in the primary distilling stage by distillation therein to a temperature between 130°–140° C. in the absence of direct steam before the benzol containing wash-oil enters the distilling column for the subsequent distillation in the presence of steam, dephlegmating the vapors from the primary distilling stage, dephlegmating the benzol crude vapors liberated in the column in the subsequent distilling stage by maintaining the dephlegmation step at a temperature of about 100° C. so that water may not condense, the wash-oil being retained in the dephlegmation step, while the steam and the benzol crude vapors escape, bypassing the subsequent distillation stage and its dephlegmation step therefor with the low boiling constituents liberated in the primary distilling stage, condensing the low boiling point vapors from the dephlegmation step for the primary distilling stage and the vapors from the dephlegmation step for the subsequent distilling stage, separating the condensed benzol crudes from water, then settling the benzol crudes to obtain an upper layer and a lower layer, and returning the lower layer from at least one of said stages as phlegm to at least one of the dephlegmation steps of the primary and subsequent distilling stages.

ADOLF SCHMALENBACH.